United States Patent [19]

Lausberg et al.

[11] Patent Number: 4,764,556

[45] Date of Patent: Aug. 16, 1988

[54] THERMOPLASTIC MOLDING MATERIALS OF POLYESTER AND POLYCARBONATE

[75] Inventors: Dietrich Lausberg, Ludwigshafen; Christof Taubitz; Manfred Knoll, both of Wachenheim, all of Fed. Rep. of Germany

[73] Assignee: BASF Aktiengesellschaft, Rheinland-Pfalz, Fed. Rep. of Germany

[21] Appl. No.: 47,132

[22] Filed: May 8, 1987

[30] Foreign Application Priority Data

May 21, 1986 [DE] Fed. Rep. of Germany ....... 3617070

[51] Int. Cl.$^4$ .............................................. C08L 69/00
[52] U.S. Cl. ..................................... 525/67; 525/133; 525/146; 525/148; 525/439
[58] Field of Search ................ 525/67, 133, 146, 148, 525/69, 92, 439

[56] References Cited

U.S. PATENT DOCUMENTS

| | | | |
|---|---|---|---|
| 3,864,428 | 2/1975 | Nakamura et al. | 260/873 |
| 4,172,859 | 10/1979 | Epstein | 428/402 |
| 4,304,709 | 12/1981 | Salee | 525/68 X |
| 4,603,170 | 7/1986 | Witman et al. | 525/67 |

FOREIGN PATENT DOCUMENTS

| | | |
|---|---|---|
| 2343609 | 3/1974 | Fed. Rep. of Germany . |
| 3227028 | 1/1984 | Fed. Rep. of Germany . |
| 2118193 | 10/1983 | United Kingdom . |

*Primary Examiner*—Theodore E. Pertilla

*Attorney, Agent, or Firm*—Oblon, Fisher, Spivak, McClelland & Maier

[57] ABSTRACT

Thermoplastic molding materials contain, as essential components, (A) from 10 to 89% by weight of a blend of
  ($A_1$) from 20 to 98% by weight, based on ($A_1$)+($A_2$), of a polyester of an aromatic dicarboxylic acid and an aliphatic dihydroxy compound and
  ($A_2$) from 2 to 80% by weight, based on ($A_1$)+($A_2$), of a polyester of an aromatic dicarboxylic acid and an aromatic dihydroxy compound of the formula I

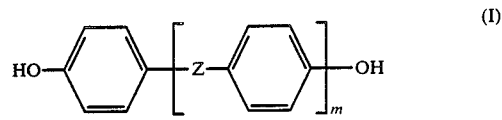

(I)

or its $C_1$-$C_6$-alkyl or halogen derivative substituted in the nucleus, where Z is an alkylene or cycloalkylene group of not more than 8 carbon atoms, an arylene group of not more than 12 carbon atoms, —O—, —S—,

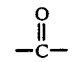

or a chemical bond and m is 0 or 1, (B) from 10 to 89% by weight of a polycarbonate and
(C) from 1 to 30% by weight of a rubber toughener having a glass transition temperature of less than −30° C.

39 Claims, No Drawings

THERMOPLASTIC MOLDING MATERIALS OF POLYESTER AND POLYCARBONATE

The present invention relates to thermoplastic molding materials containing, as essential components,
(A) from 10 to 89% by weight of a blend of
($A_1$) from 20 to 98% by weight, based on ($A_1$)+($A_2$), of a polyester of an aromatic dicarboxylic acid and an aliphatic dihydroxy compound and
($A_2$) from 2 to 80% by weight, based on ($A_1$)+($A_2$), of a polyester of an aromatic dicarboxylic acid and an aromatic dihydroxy compound of the general formula I

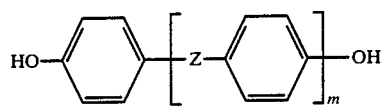 (I)

or its $C_1$-$C_6$-alkyl or halogen derivatives substituted in the nucleus, where Z is an alkylene or cycloalkylene group of not more than 8 carbon atoms, an arylene group of not more than 12 carbon atoms, —O—, —S—,

or a chemical bond and m is 0 or 1,
(B) from 10 to 89% by weight of a polycarbonate and
(C) from 1 to 30% by weight of a rubber toughener having a glass transition temperature of less than $-30°$ C.

The present invention furthermore relates to the use of the novel molding materials for the production of moldings, and to the moldings obtainable from these materials.

Blends of polyesters and polycarbonates are disclosed in DE-A-24 17 002. They have better mechanical properties than the pure polyesters.

The addition of polymers having a glass transition temperature of less than 0° C., for example acrylate-based, ethylene-based or butadiene-based graft rubbers, to polyester/polycarbonate blends is disclosed in EP-A-25 920, WO 80/972, EP-A-114 288, DE-A-23 43 609, U.S. Pat. No. 4 172 859, DE-A-33 10 754 and DE-A-32 27 028.

DE-A-34 32 412 describes thermoplastic molding materials of polyesters, polycarbonates and graft rubbers, the polyester being composed of a diol having one or more diarylsulfonyl groups and, if required, also an aliphatic diol.

All these molding materials which have been described possess satisfactory impact strength, but their heat distortion resistance is inadequate for some intended uses.

It is an object of the present invention to provide thermoplastic molding materials of polyesters and polycarbonates, which, in addition to good impact strength at low temperatures, also have good heat distortion resistance.

We have found that this object is achieved, according to the invention, by the thermoplastic molding materials defined at the outset.

The novel molding materials contain, as component (A), a blend of
($A_1$) from 20 to 98% by weight, based on ($A_1$)+($A_2$), of a polyester of an aromatic dicarboxylic acid and an aliphatic dihydroxy compound and
($A_2$) from 2 to 80% by weight, based on ($A_1$)+($A_2$), of a polyester of an aromatic dicarboxylic acid and an aromatic dihydroxy compound.

The polyesters $A_1$ present in the novel molding materials are known per se and are described in the literature. They contain an aromatic ring in the main chain, the said ring being derived from the aromatic dicarboxylic acid. The aromatic ring may furthermore be substituted, for example by halogen, such as chlorine or bromine, or by $C_1$-$C_4$-alkyl, such as methyl, ethyl, isopropyl, n-propyl, n-butyl, isobutyl or tert-butyl.

The polyesters can be prepared in a conventional manner by reacting aromatic dicarboxylic acids, their esters or other ester-forming derivatives of these acids with aliphatic dihydroxy compounds.

Preferred dicarboxylic acids are naphthalenedicarboxylic acid, terephthalic acid and isophthalic acid, and mixtures of these. Up to 10 mol % of the aromatic dicarboxylic acids can be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols of 2 to 6 carbon atoms, in particular ethane-1,2-diol, butane-1,4-diol, hexane-1,6-diol, hexane-1,4-diol, cyclohexane-1,4-diol and neopentylglycol and mixtures of these.

Particularly preferred polyesters ($A_1$) are polyalkylene terephthalates which are derived from alkanediols of 2 to 6 carbon atoms. Particularly preferred among these are polyethylene terephthalate and polybutylene terephthalate.

The relative viscosity of the polyesters ($A_1$) is in general from 1.2 to 1.8, measured in a 0.5% strength by weight solution in a phenol/o-dichlorobenzene mixture (weight ratio 1:1) at 25° C.

The fully aromatic polyesters ($A_2$) present as an essential component in the novel molding materials are derived from aromatic dicarboxylic acids and aromatic dihydroxy compounds.

Suitable aromatic dicarboxylic acids are the compounds already described for component ($A_1$). Mixtures of from 5 to 100 mol % of isophthalic acid and from 0 to 95% of terephthalic acid are preferred, mixtures of roughly equivalent amounts of these two acids being particularly preferred.

The aromatic dihydroxy compounds are of the general formula

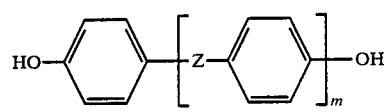

where Z is an alkylene or cycloalkylene group of not more than 8 carbon atoms, an arylene group of not more than 12 carbon atoms, —O—, —S—,

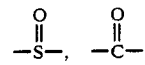

or a chemical bond and m is 0 or 1. Specific examples are
dihydroxydiphenyls,
di-(hydroxyphenyl)-alkanes,
di-(hydroxyphenyl)-cycloalkanes,
di-(hydroxyphenyl) sulfides,
di-(hydroxyphenyl) ethers,
di-(hydroxyphenyl) ketones,
di-(hydroxyphenyl) sulfoxides,
$\alpha,\alpha'$-di-(hydroxyphenyl)-dialkylbenzenes,
resorcinol and
hydroquinone and their derivatives which are alkylated in the nucleus or halogenated in the nucleus.

Preferred compounds of these types are
4,4'-dihydroxydiphenyl,
2,4-di-(4'-hydroxyphenyl)-2-methylbutane,
$\alpha,\alpha'$-di-(4'-hydroxyphenyl)-p-diisopropylbenzene,
2,2-di-(3'-methyl-4'-hydroxyphenyl)-propane and
2,2-di-(3'-chloro-4'-hydroxyphenyl)-propane, in particular
2,2-di-(4'-hydroxyphenyl)-propane,
2,2-di-(3',5'-dichlorodihydroxyphenyl)-propane,
1,1-di-(4'-hydroxyphenyl)-cyclohexane and
2,2-di-(3',5'-dimethyl-4'-hydroxyphenyl)-propane and mixtures of these.

The amount of fully aromatic polyester ($A_2$) in component (A) is from 2 to 80, preferably from 2 to 60, in particular from 3 to 50, % by weight, based on the total amount of components ($A_1$)+($A_2$).

The polycarbonates (B) are likewise known per se and are described in the literature.

These polycarbonates can preferably be prepared by reacting carbonic acid derivatives, such as phosgene or diphenyl carbonate, with diphenols. In principle, it is possible to use any diphenols, as described in, for example, the monograph by H. Schnell, Chemistry and Physics of Polycarbonates, Interscience Publishers, 1964 and U.S. Pat. No. 2,999,835 and DE-A-22 48 817. Dihydroxydiphenyl, di-(hydroxyphenyl)-alkanes and di-(hydroxyphenyl) ethers and mixtures of these are particularly preferred diphenols.

A particularly preferred diphenol is 2,2-di-(4'-hydroxyphenol)-propane (bisphenol A). This can also be used as a mixture with other diphenols, such as 2,2-di-(4'-hydroxyphenyl)-pentane, 2,6-dihydroxynaphthalene, 4,4'-dihydroxydiphenyl sulfone, di-(4-hydroxyphenyl) ether, di-(4-hydroxyphenyl) sulfite, di-(4-hydroxyphenyl)-methane, 1,1-di-(4'-hydroxyphenyl)-ethane or 4,4-dihydroxydiphenyl. The amount of bisphenol A in mixtures of this type is in general from 70 to 98% by weight.

Processes for the preparation of polycarbonates of this type are known per se and are described in, for example, U.S. Pat. No. 2,999,835 and DE-A-22 48 817, already mentioned above, and in DE-A-13 00 266 and DE-A-14 95 730.

The relative viscosity of the polycarbonates B) is in general from 1.2 to 1.5, preferably from 1.28 to 1.40, dl/g, measured in 0.5% strength by weight solution in dichloromethane at 25° C.

The amount of polycarbonates (B) is from 10 to 89, preferably from 20 to 78, in particular from 40 to 65, % by weight, based on the total weight of the components (A) to (C).

The novel thermoplastic molding materials contain, as component (C), from 1 to 30, preferably from 2 to 25, in particular from 5 to 15, % by weight, based on the total weight of components (A) to (C), of an elastomer (rubber) which has a glass transition temperature of less than −30° C., preferably less than −40° C., and increases the impact strength.

Very generally, these are copolymers which are preferably composed of two or more of the following monomers, ethylene, propylene, butadiene, isobutene, isoprene, chloroprene, vinyl acetate, styrene, acrylonitrile and acrylates and methacrylates where the alcohol component is of 1 to 18 carbon atoms.

Polymers of this type are described in, for example, Houben-Weyl, Methoden der organischen Chemie, vol. 14/1 (Georg-Thieme-Verlag, Stuttgart, 1961), pages 392–406, and in the monograph by C. B. Bucknall, Toughened Plastics (Applied Science Publishers, London, 1977).

A few preferred types of such elastomers are described below.

A first preferred group comprises the ethylene/propylene (EPM) and ethylene/propylene/diene (EPDM) rubbers, which preferably have a ratio of ethylene radicals to propylene radicals of from 40:60 to 65:35.

The Mooney viscosities (MLI+4/100° C.) of such noncrosslinked EPM and EPDM rubbers (gel contents generally less than 1% by weight) are preferably from 25 to 100, in particular from 35 to 90 (measured using a large rotor after a running time of 4 minutes at 100° C. according to DIN 53,523).

In general, EPM rubbers contain virtually no double bonds, whereas EPDM rubbers possess from 1 to 20 double bonds per 100 carbon atoms.

Examples of diene monomers for EPDM rubbers are conjugated dienes, such as isoprene and butadiene, non-conjugated dienes of 5 to 25 carbon atoms, such as 1,4-butadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, as well as alkenylnorbornenes, such as 5-ethylidene-2-norbornene, 5-butylidene-2-norbornene, 2-methallyl-5-norbornene, 2-isopropenyl-5-norbornene and tricyclodienes, such as 3-methyltricyclo(5.2.1.0.2.6)-3,8-decadiene and mixtures of these. 1,5-hexadiene, 5-ethylidenenorbornene and dicyclopentadiene are preferred. The diene content of the EPDM rubbers is preferably from 0.5 to 10, in particular from 1 to 8, % by weight, based on the total weight of the rubber.

EPM and EPDM rubbers may also be grafted with reactive carboxylic acids or their derivatives. Acrylic acid, methyacrylic acid and their derivatives and maleic anhydride may be mentioned here merely as typical examples.

Another group of preferred rubbers comprises copolymers of ethylene with acrylates and/or methacrylates, in particular those which additionally contain epoxide groups. These epoxide groups are preferably incorporated in the rubber by adding to the monomer mixture epoxide-containing monomers of the general formulae II or III

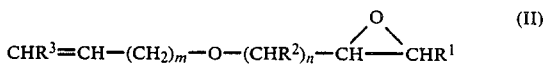 (II)

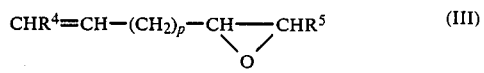 (III)

where $R^1$, $R^2$, $R^3$, $R^4$ and $R^5$ are each hydrogen or alkyl of 1 to 6 carbon atoms, m is an integer from 0 to 20, n is an integer from 0 to 10 and p is an integer from 0 to 5.

$R^1$, $R^2$ and $R^3$ are each preferably hydrogen, m is preferably 0 or 1 and n is preferably 1. The corresponding compounds are alkyl glycidyl ethers or vinyl glycidyl ethers.

Examples of preferred compounds of the formula II are epoxide-containing esters of acrylic acid and/or methacrylic acid, glycidyl acrylate and glycidyl methacrylate being particularly preferred compounds of this type.

The ethylene content of the copolymers is in general from 50 to 98% by weight, and the amount of epoxide-containing monomers and that of the acrylate and/or methacrylate are each from 1 to 49% by weight.

Particularly preferred copolymers are those consisting of from 50 to 98, in particular from 60 to 95, % by weight of ethylene, from 1 to 40, in particular from 3 to 20, % by weight of glycidyl acrylate and/or methacrylate, and from 1 to 45, in particular from 10 to 35, % by weight of n-butyl acrylate and/or 2-ethylhexylacrylate.

Other preferred esters of acrylic and/or methacrylic acid are the methyl, ethyl, propyl, isobutyl and tert-butyl esters.

Vinyl esters and vinyl ethers can also be used as comonomers.

The ethylene copolymers described above can be prepared by a conventional process, preferably by random copolymerization under high pressure and at elevated temperatures. Appropriate processes are described in the literature.

The melt flow index of the ethylene copolymers is in general from 1 to 80 g/10 min (measured at 190° C. and under a load of 2.16 kg).

Other preferred elastomers (rubbers) (C) are graft copolymers with butadiene, butadiene/styrene, butadiene/acrylonitrile and acrylates as the grafting base, as described in, for example, DE-A-16 94 173 and DE-A-23 48 377.

Particular examples of these are the ABS polymers, as described in DE-A-20 35 390, DE-A-22 48 242 and EP-A-22 216, the polymers described in the last-mentioned publication being particularly preferred.

Other rubbers (C) which may be used are graft polymers of from 25 to 98% by weight of an acrylate rubber having a glass transition temperature of less than $-20°$ C., as the grafting base, and from 2 to 75% by weight of a copolymerizable ethylenically unsaturated monomer whose homopolymers and copolymers have a glass transition temperature higher than 25° C., as the graft.

The grafting bases are acrylate or methacrylate rubbers, in which up to 40% by weight of other comonomers may be present. The $C_1$–$C_8$-esters of acrylic acid or methacrylic acid and their halogenated derivatives as well as aromatic acrylates and mixtures of these are preferred. Examples of comonomers in the grafting base are acrylonitrile, methacrylonitrile, styrene, α-methylstyrene, acrylamides, methacrylamides and vinyl-$C_1$–$C_6$-alkyl ethers.

The grafting base can be noncrosslinked or partially or completely crosslinked. Crosslinking is effected by copolymerization of, preferably, from 0.02 to 5, in particular from 0.05 to 2, % by weight of a crosslinking monomer containing more than one double bond. Suitable crosslinking monomers are described in, for example, DE-A-27 26 256 and EP-A-50 265.

Preferred crosslinking monomers are triallyl cyanurate, triallyl isocyanurate, triacryloylhexahydro-s-triazine and trialkylbenzenes.

If the crosslinking monomer contains more than 2 polymerizable double bonds, it is advantageous to restrict its amount to no more than 1% by weight, based on the grafting base.

Particularly preferred grafting bases are emulsion polymers having a gel content of more than 60% by weight (determined in dimethylformamide at 25° C. according to M. Hoffmann, H. Krömer and R. Kuhn, Polymeranalytik, Georg-Thieme-Verlag, Stuttgart, 1977).

Other suitable grafting bases are acrylate rubbers having a diene core, as described in, for example, EP-A-50 262.

Particularly suitable graft monomers are styrene, α-methylstyrene, acrylonitrile, methacrylonitrile and methyl methacrylate and mixtures of these, in particular mixtures of styrene and acrylonitrile in a weight ratio of from 90:10 to 50:50.

The grafting yield, ie. the quotient of the amount of grafted monomer to the amount of graft monomer used is in general from 20 to 80%.

Acrylate-based rubbers which can be used according to the invention are described in, for example, DE-A-24 44 584 and DE-A-27 26 256.

The rubbers C have a glass transition temperature of less than $-30°$ C., in particular less than $-40°$ C., resulting in good impact strength even at low temperatures.

Blends of the abovementioned types of rubbers can of course also be used.

In addition to the essential components (A) to (C), the novel molding materials may contain conventional additives and processing assistants. The amount of these is in general not more than 60, preferably not more than 50, % by weight, based on the total weight of components (A) to (C).

Examples of conventional additives are stabilizers and antioxidants, heat stabilizers and UV stabilizers, lubricants, mold release agents, colorants, such as dyes and pigments, fibrous and powdered fillers and reinforcing agents, nucleating agents and plasticizers.

Examples of antioxidants and heat stabilizers which can be added to the thermoplastic materials according to the invention are halides of metals of group I of the Periodic Table, for example sodium, potassium or lithium halides, if necessary in combination with copper(I) halides, eg. chlorides, bromides, or iodides. Sterically hindered phenols, hydroquinones, substituted members of this group and mixtures of these may also be used, preferably in concentrations of not more than 1% by weight, based on the total weight of the mixture.

Examples of UV stabilizers are various substituted resorcinols, salicylates, benzotriazoles and benzophenones, which are generally used in amounts of not more than 2.0% by weight.

Lubricants and mold release agents, which as a rule are added in amounts of not more than 1% by weight, based on the thermoplastic material, are stearic acids, stearyl alcohol, stearates and stearamides and the fatty acid esters of pentaerythritol.

Organic dyes, such as nigrosine, pigments, eg. titanium dioxide, cadmium sulfide, cadmium sulfide selenide, phthalocyanines, ultramarine blue or carbon black, can also be added. The novel molding materials may furthermore contain fibrous and powdered fillers and reinforcing agents, such as carbon fibers, glass fibers, amorphous silica, asbestos, calcium silicate, calcium metasilicate, magnesium carbonate, kaolin, chalk, powdered quartz, mica or feldspar, in amounts of not more than 50% by weight, based on components (A) to (C). Nucleating agents, such as talc, calcium fluoride, sodium phenylphosphinate, alumina or finely divided polytetrafluoroethylene, can be used in amounts of, for example, not more than 5% by weight, based on components (A) to (C).

The novel thermoplastic molding materials can be prepared by mixing components (A) and (B) and, if required, additives, and mixing the elastomers (rubbers) (C) into the molten mixture of polyester and polycarbonate in a conventional mixing apparatus, such as an extruder, a Brabender mill or a Banbury mill. The material can then be extruded, cooled and comminuted. The mixing temperatures are as a rule from 240° to 280° C.

The molding materials according to the invention are useful for the production of tough heat-stable moldings having a high impact strength for a wide variety of industrial purposes, by the injection molding or extrusion method.

They are distinguished by a particularly good low-temperature impact strength coupled with good heat distortion resistance.

EXAMPLES

The following components were used for the preparation of novel molding materials:

Component $A_1$

Polyethylene terephthalate having a relative viscosity of 1.38 (0.5% strength by weight solution in 1:1 phenol/o-dichlorobenzene at 25° C.).

Component $A_1'$

Polybutylene terephthalate having a relative viscosity of 1.6 (determined as for $A_1$).

Component $A_2$

Polyester of bisphenol A and isophthalic/terephthalic acid (equimolar ratio) having a relative viscosity of 0.66, measured on a 0.2% strength by weight solution in chloroform at 49° C.

Component B

Polycarbonate based on bisphenol A and having a relative viscosity of 1.36 (0.5% strength by weight in dichloromethane at 25° C.).

Component C/1

Ethylene/n-butylacrylate/acrylic acid copolymer (weight ratio 66:30:4) having a glass transition temperature of −42° C. and a melt flow index (190° C./2.16 kg load) of 15 g/10 min.

Component C/2

Ethylene/n-butyl acrylate glycidyl methacrylate copolymer (weight ratio 67:30:3) having a glass transition temperature of −48° C.

Component C/3

Graft rubber having a grafting base (75% by weight) of crosslinked n-butyl acrylate and a grafted shell (25% by weight) of styrene and acrylonitrile in a weight ratio of 75:25 (prepared by the process described in DE 24 44 584).

Component C4

Graft rubber having a grafting base (70% by weight) of crosslinked polybutadiene, 8% by weight of a first grafted shell of styrene and 22% by weight of a second grafted shell of methylmethacrylate, having a glass transition temperature of −78° C.

Components (A) to (C) were thoroughly mixed, melted in a twin-screw extruder at 270° C. and homogenized, and the melt was extruded into a water bath. The extrudates were granulated and dried, the molding material was then converted to test specimens on an injection molding machine, and the specimens were tested without after-treatment.

The results of the notched impact strength measurements according to DIN 53,453 and the determination of the Vicat B temperature according to DIN 53,460 are shown in the Table below.

For comparison, molding materials without component $A_2$ were prepared in Examples I to V.

The results show the improved impact strength and greater heat distortion resistance of the novel molding materials containing component ($A_2$) in comparison with molding materials without component ($A_2$).

TABLE

| (amounts in % by weight) | | | | | Notched impact strength DIN 53 453 $a_K$ [KJ/m$^2$] | | Vicat B DIN 53 460 [°C.] |
|---|---|---|---|---|---|---|---|
| No. | $A_1$ | $A_1$ | $A_2$ | B | C | −20° C. | −40° C. | |
| I | 40 | — | — | 50 | 10 C/2 | 15.2 | 6.3 | 133 |
| II | — | 40 | — | 50 | 10 C/4 | 14.0 | 8.2 | 120 |
| III | 20 | 20 | — | 50 | 5 C/3 | 14.5 | 8.0 | 122 |
| IV | 20 | 20 | — | 50 | 5 C/1 | 13.2 | 6.1 | 121 |
| V | 20 | — | — | 70 | 10 C/2 | 22 | 12 | 134 |
| 1 | — | 30 | 10 | 50 | 10 C/2 | 20.2 | 10.6 | 126 |
| 2 | — | 20 | 20 | 50 | 10 C/2 | 25.6 | 11.3 | 131 |
| 3 | — | 10 | 30 | 50 | 10 C/2 | 32.4 | 15.2 | 137 |
| 4 | 10 | 10 | 20 | 50 | 6 C/4 4 C/1 | 33.5 | 16.7 | 140 |
| 5 | 20 | — | 20 | 50 | 6 C/4 4 C/1 | 26.5 | 14.2 | 142 |
| 6 | 10 | — | 30 | 50 | 10 C/3 | 31.2 | 9.6 | 147 |
| 7 | 20 | — | 20 | 50 | 10 C/2 | 24.8 | 12.2 | 142 |
| 8 | 30 | — | 10 | 50 | 10 C/2 | 18.9 | 10.8 | 137 |
| 9 | 10 | — | 10 | 70 | 10 C/4 | 33.6 | 16.5 | 146 |
| 10 | 5 | — | 15 | 70 | 10 C/3 | 27.2 | 11.4 | 151 |
| 11 | — | 10 | 10 | 70 | 5 C/1 5 C/2 | 28.4 | 13.1 | 143 |

We claim:

1. A thermoplastic molding material, comprising:
(A) from 10 to 89% by weight of a blend of
($A_1$) from 20 to 98% by weight, based on ($A_1$)+($A_2$), of a polyester of an aromatic dicarboxylic acid and an aliphatic dihydroxy compound and
($A_2$) from 2 to 80% by weight, based on ($A_1$)+($A_2$), of a polyester of an aromatic dicarboxylic acid and an aromatic dihydroxy compound of the formula I

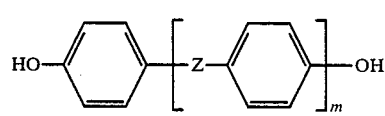

(I)

or its $C_1$–$C_6$-alkyl or halogen derivative substituted in the nucleus, where Z is an alkylene or cycloalkylene group of not more than 8 carbon atoms, an arylene group of not more than 12 carbon atoms, —O—, —S—,

or a chemical bond and m is 0 or 1, (B) from 10 to 89% by weight of polycarbonate and (C) from 1 to 30% by weight of a rubber toughener having a glass transition temperature of less than −30° C.

2. The thermoplastic molding material of claim 1, wherein said polyester $A_1$ comprises an aromatic dicarboxylic acid moeity comprising an aromatic ring which is unsubstituted or an aromatic ring which is substituted by at least one member selected from the group consisting of halogen atoms and $C_{1-4}$-alkyl groups.

3. The thermoplastic molding material of claim 2, wherein said halogen atom is a chlorine atom or a bromine atom.

4. The thermoplastic molding material of claim 2, wherein said $C_{1-4}$-alkyl is methyl, ethyl, isopropyl, n-propyl, n-butyl, iso-butyl or tetra-butyl.

5. The thermoplastic molding material of claim 1, wherein said polyester $A_1$ comprises a dicarboxylic acid moiety which is at least one member selected from the group consisting of naphthalenedicarboxylic acid, terephthalic acid, and isophthalic acid.

6. The thermoplastic molding material of claim 1, wherein up to 10 mol% of said aromatic dicarboxylic acid of said polyester $A_1$ is replaced by an aliphatic or cycloaliphatic dicarboxylic acid.

7. The thermoplastic molding material of claim 6, wherein up to 10 mol% of said aromatic dicarboxylic acid moiety is replaced by adipic acid, azelaic acid, sebacic acid, dodecanedioic acid, or a cyclohexane dicarboxylic acid.

8. The thermoplastic molding material of claim 1, wherein said polyester $A_1$ comprises a $C_{2-6}$ aliphatic dihydroxy compound.

9. The thermoplastic molding material of claim 8, wherein said aliphatic dihydroxy compound comprises ethane-1,2-diol, butane-1,4-diol, hexane-1,6-diol, hexane-1,4-diol, cyclohexane-1,4-diol, neopentylglycol or a mixture thereof.

10. The thermoplastic molding material of claim 1, wherein said polyester $A_1$ is a polyalkylene terephthalate derived from a $C_{2-6}$ alkane diol.

11. The thermoplastic molding material of claim 1, wherein said polyester $A_1$ is polyethylene terephthalate or polybutylene terephthalate.

12. The thermoplastic molding material of claim 1, wherein said polyester $A_2$ comprises aromatic dicarboxylic acid moieties comprising naphthalenedicarboxylic acid, terephthalic acid, isophthalic acid, or a mixture thereof.

13. The thermoplastic molding material of claim 1, wherein said polyester $A_2$ comprises from 5 to 100 mol% of isophthalic acid and from 0 to 95 mol% of terephthalic acid.

14. The thermoplastic molding material of claim 1, wherein group Z of said compound of formula I is at least one member selected from the group consisting of dihydroxy diphenyls, di-(hydroxyphenyl)-alkanes, di-(hydroxyphenyl)-cycloalkanes, di-(hydroxyphenyl) sulfides, di-(hydroxyphenyl) ethers, di-(hydroxyphenyl) ketones, di-(hydroxyphenyl) sulfoxides, $\alpha,\alpha'$-di(hydroxyphenyl)-dialkylbenzenes, resorcinol, hydroquinone, and their derivatives possessing alkylated nuclei and their derivatives possessing halogenated nuclei.

15. The thermoplastic molding material of claim 1, wherein group Z of said compound of formula I comprises 4,4'-dihydroxydiphenyl; 2,4-di(4'-hydroxyphenyl)-2-methylbutane; $\alpha,\alpha'$-di-(4-hydroxphenyl)-p-diisopropylbenzene; 2,2-di-(3'-methyl-4'-hydroxyphenyl)-propane; 2,2-di-(3'-chloro-4'-hydroxyphenyl)-propane, 2,2-di-(4'-hydroxyphenyl)-propane; 2,2-di-(3',5'-dimethyl-4'-hydroxyphenyl)-propane; or a mixture thereof.

16. The thermoplastic molding material of claim 15, wherein group Z of said compound of formula I is 2,2-di-(4'-hydroxyphenyl-propane); 2,2-di-(3',5'-dichlorodihydroxyphenyl)-propane; 1,1-di-(4'-hydroxyphenyl)-cyclohexane; 2,2-di-(3',5'-dimethyl-4'-hydroxyphenyl)-propane; or a mixture thereof.

17. The thermoplastic molding material of claim 1, wherein said component (A) comprises from 2 to 60% by weight of ($A_2$) based on ($A_1$)+($A_2$).

18. The thermoplastic molding material of claim 1, wherein said component (A) comprises from 3 to 50% by weight of said polyester ($A_2$) based on ($A_1$)+($A_2$).

19. The thermoplastic molding material of claim 1, wherein said polycarbonate possesses a relative viscosity of from 1.2 to 1.5 dl g$^{-1}$ as measured in 0.5% strength by weight solution in dichloromethane at 25° C.

20. The thermoplastic molding material of claim 19, wherein said relative viscosity is from 1.28 to 1.40 dl g$^{-1}$.

21. The thermoplastic molding material of claim 1, comprising from 20 to 78% by weight of said component (B).

22. The thermoplastic molding material of claim 1, comprising from 40 to 65% by weight of said component (B).

23. The thermoplastic molding material of claim 1, comprising from 2 to 25% by weight of said component (C).

24. The thermoplastic molding material of claim 1, comprising from 5 to 15% by weight of said component (C).

25. The thermoplastic molding material of claim 1, wherein said component (C) possesses a glass transition temperature of less than −40° C.

26. The thermoplastic molding material of claim 1, wherein said rubber is a copolymer composed of at least two members selected from the group consisting of ethylene, propylene, butadiene, isobutene, isoprene, chloroprene, vinyl acetate, styrene, acrylonitrile, and acrylates and methacrylates having a $C_{1-18}$ alcohol component.

27. The thermoplastic molding material of claim 1, wherein said component (C) comprises an ethylene/propylene or an ethylene/propylene/diene rubber having a ratio of ethylene radicals to propylene radicals of from 40:60 to 65:35.

28. The thermoplastic molding material of claim 27, wherein said ethylene/propylene/diene rubber comprises as said diene at least one member selected from the group consisting of isoprene, butadiene, nonconjugated dienes of 5 to 25 carbon atoms, cyclic dienes, and mixtures of these.

29. The thermoplastic molding material of claim 28, wherein said non-conjugated dienes of 5 to 25 carbons comprises 1,4-butadiene, 1,4-hexadiene, 1-5 hexadiene, 2,5-dimethyl-1,5-hexadiene or 1,4-octadiene, wherein said cyclic diene comprises cyclopentadiene, cyclohexadiene, cyclooctodiene, dicylcopentadiene, or an alkenylnorbornene.

30. The thermoplastic molding material of claim 1, wherein said component (C) comprises a copolymer of ethylene with an acrylate or a copolymer of ethylene with a methacrylate, or said component (C) comprises a graft copolymer with butadiene, butadiene/styrene, butadiene/acrylonitrile and an acrylate as the grafting base, or wherein said component (C) comprises a graft polymer of 25–98% by weight of an acrylate rubber having a glass transition temperature of less than $-20°$ C., as the grafting base, and from 2–75% by weight of a copolymerizable ethylenically unsaturated monomer whose homopolymers and copolymers have a glass transition temperature higher than 25° C., as the graft.

31. A molding obtained by molding a thermoplastic molding material comprising:
(A) from 10 to 89% by weight of a blend of
($A_1$ from 20 to 98% by weight, based on ($A_1$)+($A_2$), of a polyester of an aromatic dicarboxylic acid and an aliphatic dihydroxy compound and
($A_2$) from 2 to 80% by weight, based on ($A_1$)+($A_2$), of a polyester of an aromatic dicarboxylic acid of an aromatic dihydroxy compound of the formula I

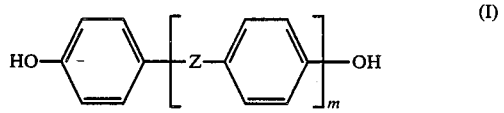

or its $C_1$–$C_6$-alkyl or halogen derivative substituted in the nucleus, where Z is an alkylene or cycloalkylene group of not more than 8 carbon atoms, an arylene group of not more than 12 carbon atoms, —O—, —S—, —CO— or a chemical bond and m is 0 or 1;

(B) from 10 to 89% by weight of a polycarbonate and
(C) from 1 to 30% by weight of a rubber toughener having a glass transition temperature of less than $-30°$ C.

32. The molding of claim 31, wherein said polyester ($A_1$) comprises an aromatic dicarboxylic acid moeity comprising an aromatic ring which is unsubstituted or an aromatic ring which is substituted by at least one member selected from the group consisting of halogen atoms and $C_{1-4}$-alkyl groups.

33. The molding of claim 32, wherein said halogen atom is a chlorine atom or a bromine atom.

34. The molding of claim 32, wherein said $C_{1-4}$-alkyl is methyl, ethyl, isopropyl, n-propyl, n-butyl, iso-butyl or tetra-butyl.

35. The molding of claim 31, wherein said polyester ($A_1$) comprises a dicarboxylic acid moiety which is at least one member selected from the group consisting of naphthalenedicarboxylic acid, terephthalic acid, and isophthalic acid.

36. The molding of claim 31, wherein up to 10 mol% of said aromatic dicarboxylic acid of said polyester ($A_1$) is replaced by an aliphatic or cycloaliphatic dicarboxylic acid.

37. The molding of claim 36, wherein up to 10 mol% of said aromatic dicarboxylic acid moiety is replaced by adipic acid, azelaic acid, sebacic acid, dodecanedioic acid, or a cyclohexane dicarboxylic acid.

38. The molding of claim 31, wherein group Z of said compound of formula I is at least one member selected from the group consisting of dihydroxy diphenyls, di-(hydroxyphenyl)-alkanes, di-(hydroxyphenyl)-cycloalkanes, di(hydroxyphenyl) ketones, di(hydroxyphenyl) sulfoxides, $\alpha,\alpha'$-di(hydroxyphenyl)-dialkylbenzenes, resorcinol, hydroquinone, and their derivatives possessing alkylated nuclei and their derivatives possessing halogenated nuclei.

39. The molding of claim 31, wherein group Z of said compound of formula I comprises 4,4'-dihyroxydiphenyl; 2,4-di(4'-hydroxyphenyl)-2-methylbutane; $\alpha,\alpha'$-di-(4-hydroxyphenyl)-p-diisopropylbenzene; 2,2-di-(3'-chloro-4'-hydroxyphenyl)-propane, 2,2-di-(4'-hydroxyphenyl)-propane; or a mixture thereof.

* * * * *